United States Patent Office 2,892,727
Patented June 30, 1959

2,892,727

INDURATING COMPOSITIONS FOR HYDRAULIC CEMENTITIOUS MIXTURES

Donald R. MacPherson, Ridgefield, Conn., assignor to Johns-Manville Corporation, New York, N.Y., a corporation of New York No Drawing. Application May 22, 1956
Serial No. 586,385

22 Claims. (Cl. 106—88)

This invention relates to hydraulic cement compositions such as concrete or mortar and to indurating compositions for addition to concrete or mortar mixes. It especially relates to such compositions and mixes containing plasticizing agents which permit substantial improvement in the strength and the weather or freezing and thawing resistance of structures prepared from such compositions.

The use of agents such, for example, as waste sulfite liquor to reduce the water-cement ratio of a hydraulic cement mortar or concrete, has permitted substantial improvement in the properties of structures formed thereof. However, very often some marked disadvantages have been connected with the use of the agents, heretofore proposed, which have limited commercial acceptance of the cement compositions containing them. Thus, when small amounts of raw waste sulfite liquor or the dry residue thereof are added to concrete or mortar mixes, as disclosed in the United States Patents 2,169,980 and 2,229,311 of Edward W. Scripture, the water-cement ratio may be reduced a very substantial amount and the strength of the concrete at later ages is substantially increased. However, the use of these plasticizing or water-reducing agents with some cements may be disadvantageous in that the strength at early ages of mortar or concrete, such as 1–7 days, may be less than that for plain mortar or concrete, and in that the amount for optimum results in some instances may be critical, even though an accelerator be present. Raw waste sulfite liquor or the dry residue thereof contains a substantial amount of wood sugar, both fermentable and non-fermentable, of the order of 15–22% by weight of the dry solids. The presence of these sugars, with or without accelerators, is often detrimental in that they tend to inhibit the normal hydration reactions of some of the chemical constituents in Portland cement. My U.S. Patent 2,435,594 discloses the addition to cement, or to mortar or concrete mixes, of "residuum solids of fermented sulfite liquor." I defined this term in my Patent 2,435,594 as designating solids from the residue of waste sulfite liquor such as has been fermented and from which the fermented product, such as alcohol, has been removed. While the use of "residuum solids of fermented sulfite liquor" in cement, mortar and concrete mixes resulted in substantial improvements over the prior art procedures and added to the strength properties of cement, mortars or concrete as compared to the corresponding properties of cement, mortars or concrete mixes containing raw waste sulfite liquor as disclosed in the U.S. patents of Edward W. Scripture as cited above, the improvements to cement, mortar or concrete mixes, due to the presence of the "residuum solids of fermented sulfite liquor," were not always obtained with some Portland cements. In the preparation of the "residuum solids of fermented sulfite liquor," the nonfermentable sugars present in the original raw waste sulfite liquor before fermentation are retained in the residuum solids. The presence of these nonfermentable sugars in variable amounts, is detrimental to the normal hydration reactions of some of the chemical constituents with some Portland cements.

It has been known that certain materials, such as, for example, certain saponifiable resins, the long-chain alkyl sulfates, such as lauryl sodium sulfate, and the so-called alkyl aryl sulfonates and the like, when added to cement compositions such as mortar and concrete in relatively small amounts cause the cement compositions to entrain a small amount of air, which surprisingly provides a marked improvement in the ability of the concrete to withstand freezing and thawing cycles. It has been generally recognized by those skilled in the art and techniques of concrete technology that these air-entraining agents when used alone give very little, if any, improvement in the compressive strength of the concrete produced with these agents. In fact, it is usually the case that these air-entraining agents cause a reduction in the compressive and flexural strength of Portland cement concrete or mortars even though they produced marked improvement in the weatherability of the concrete.

Also, it is well-known that cement, mortar or concrete is often deficient in fine material, so that the most desirable grade of composition is not always secured. Sometimes fine materials other than Portland cement are added to the mix to overcome this deficiency. In addition, it is very often desirable and necessary to add a fine material other than Portland cement to concrete to lower the rate of heat evolved in mass structures. In other instances, it is very often desirable and necessary to add fine material, usually pozzolanic in nature, to Portland cement concrete to inhibit or retard the so-called alkali-aggregate reaction, a reaction which takes place in the presence of water to cause disintegration of the concrete due to the chemical combination of the alkali metals present in Portland cement concrete with opaline silica and obsidian aggregate particles.

Another well-known practice is the use of pozzolanic materials in Portland cement, mortars or concrete to lower the water soluble constituents present in hydraulic cement compositions. That is accomplished by the reaction between the free calcium hydroxide released from the hydrolysis of the high lime calcium silicates present in Portland cement and the silica present in fine pozzolanic materials to form a low lime calcium silicate of low solubility. The tying up of calcium hydroxide in this manner with pozzolanic materials improves impermeability and sulfate resistance of cement, mortars or concrete. Pozzolanic materials or fine inert substances, particularly when used alone in substantial amounts in Portland cement mortars or concrete, lower the strength at the ages of about 1–28 days, but on the other hand, they may increase the strength at later ages as compared to coresponding plain concrete with the same design and consistency. Pozzolans and other inert fines when used in small amounts produce lower or essentially no improvement in the 1, 7 or 28 day strengths of concrete. Pozzolanic materials may be used, either as a partial replacement for Portland cement in concretes or as a straight additive to concrete, in the range of 2–30% by weight of the cement.

It is an object of the present invention to provide cement compositions or indurating compositions for cement mixes comprising ingredients of low cost which markedly plasticize concrete or mortar mixes, which improve the strength of the concrete at later ages and which are not deleterious to cement mixes if inadvertently added in relatively larger amounts than usually are needed.

It is another object of the present invention to provide improved strengths at early and late ages of concrete or mortar mixes of a given consistency made with a lower water-cement ratio than that of a plain mortar or concrete mix having the same proportions of cement and aggregate.

It is another object of the present invention to provide a method of preparing concrete having improved compressive strengths at early as well as later ages.

A further object of the present invention is to provide an indurating composition for adding to the cement or concrete mixes which accelerates the rate of hardening of the cement as well as permitting a reduction in the water-cement ratio, making increased compressive strengths at all ages.

A further object of the present invention is to provide a dry cement which when mixed with coarse aggregate and sand permits a reduction in the normal amount of water at a given consistency and gives a higher strength to products made therewith.

A still further object of the present invention is to provide a cement composition or indurating composition for cement, mortar and concrete mixes which will show outstanding reduction in the bleeding characteristics as compared to that of plain mortar or concrete of the same consistency having the same proportions of cement and aggregate.

It is still a further object of the present invention to provide an indurating composition for addition to cement or concrete mixes which will markedly improve the freezing and thawing resistance of products made therewith.

I have found that the above and other objects, which will be apparent from the following description of the invention, are accomplished by incorporating in the cement, mortar or concrete mixes, an additive comprising the residuum of sulfite liquor which has been altered with bacteria which convert the sugar therein to acids, or salts of the acidic components of said residuum. This conversion may be readily affected by inoculating the residuum with a culture of acid-forming bacilli such as, for example, *Lactobacillus pentoaceticus, Lactobacillus bulgaricus, Bacillus delbrückii* or *Streptococcus lacticus*. It is a feature of this residuum that after bacterial alteration nothing is removed from the product. For ease of consideration the term "acidic residuum" will be used hereinafter to define this bacterially altered product.

The salts of the bacteria converted acidic residuum may be the reaction product of said acidic residuum and either an inorganic base or an organic base. Suitable inorganic bases include hydroxides and carbonates of alkali and alkaline earth metals (groups I and II metals), preferably calcium or magnesium. The salts may consist of the reaction product of the acidic residuum and an organic base such as a primary, secondary or tertiary amine or alkamine of the following general formula:

where each radical R, R' or R", independently of the others, may consist of a hydrogen atom, an alkyl group containing from 1 to about 6 carbon atoms or an alcohol containing from 1 to about 6 carbons atoms. This invention is not to be confined to an additive consisting only of one or more specific acids or limited to any particular theory, but for the purposes of illustration, rather than limitation, observations suggest that the number of acid(s) and/or the particular acid(s) present in the acidic residuum of converted waste sulfite liquor are determined by the particular sugar(s) initially present in the original raw waste sulfite liquor and the particular acid-forming bacilli utilized to convert the sugar(s) to acid(s). Accordingly, the terms "acids," or "salts" of the said acids or acidic components of the residuum of sulfite liquor which have been altered with acid-forming bacteria, as used throughout this specification and the appended claims, are not to be construed or defined as limiting to a specific acid or acids, salt or salts thereof, but simply to denote the acidiferous reaction product, whether one or more acids, of waste sulfite liquor which has been altered with bacteria which convert the sugar(s) therein to acid(s), or salt(s) of said acidiferous reaction product.

I have found that the above defined acidic residuum or the salts thereof produce resultant cement, mortar and concrete mixes that are greatly superior to those produced with raw waste sulfite liquor or with the "residuum solids of fermented sulfite liquor" as defined in my prior Patent No. 2,435,594.

The data herein reported indicate that the bacterial alteration of sulfite liquor modifies the character of the active constituents normally in raw waste sulfite liquor so that the acidic residuum or the salts thereof give substantially improved properties to cement, mortar and concrete mixes.

I have found that when the acidic residuum or the salts thereof are used in conjunction with any of the conventional air-entraining agents suitable for use in cement, mortar or concrete mixes, such as, for example, those mentioned above, the benefits produced in concrete etc. with these additions far exceed those which would be expected based upon the performance of concrete containing either the acidic residuum or the salts thereof, or air-entraining agents used separately.

In addition, I have found that when the acidic residuum or the salts thereof are used in cement, mortar or concrete mixes in conjunction with diatomaceous earth, the properties of the resulting concrete etc. far exceed those which would be expected based upon the performance of concrete containing either the acidic residuum or the salts thereof or concrete containing only the diatomaceous earth. The diatomaceous earth herein referred to may be defined as natural diatomaceous earth which has been refined by suitable drying and pulverizing equipment. Also the diatomaceous earth may be further refined by being pulverized to such a degree that the diatom cellular structure is destroyed and thereby obtains new and unexpected results in cement, mortar and concrete mixes. I have found that pozzolanic materials other than diatomaceous earth function in a similar manner when used with the acidic residuum or the salts thereof, but, in general, these pozzolans are not as effective as the diatomaceous earth referred to herein. Pozzolans such as uncalcined diatomaceous earth, calcined diatomaceous shales and clays, volcanic ash, calcined clays and shales, etc. are suitable for use with the plasticizing agents of this invention. The data herein reported will show this outstanding behavior of the acidic residuum or the salts thereof when used in concrete with diatomaceous earth.

I have found further that when the acidic residuum or the salts thereof are used in cement, mortar or concrete mixes in conjunction with air-entraining agents and diatomaceous earth that the properties of the concrete etc. are outstandingly superior to those which would be expected based upon the performance of any of the individual ingredients used alone in concrete; that is, concrete containing only the acidic residuum or the salts thereof or only air-entraining agents or only diatomaceous earth.

As little as 0.01% based upon the weight of the cement, of the acidic residuum or the salts thereof is noticeably effective in improving the properties of cement, or mortar and concrete mixes produced therefrom. An amount of acidic residuum or salts thereof much greater than 0.5% by weight of the cement is not usually commercially economical, and for most purposes, smaller amounts of acidic residuum or the salts thereof produce optimum results. The amount of the acidic residuum or the salts thereof preferably employed is approximately 0.05 to 0.3% by weight of the cement.

In the preferred embodiment of this invention the cement mixes comprise a hydraulic cement, the acidic residuum or salts thereof, an extremely finely divided diatomaceous earth, and a suitable air-entraining agent.

These ingredients are preferably proportioned to provide in percent by weight of the cement, approximately 0.05 to 0.3% of the acidic residuum or the salts thereof, from approximately 0.005 to 0.20% of an air-entraining agent, and a highly reactive pozzolanic material such as finely divided diatomaceous earth in the proportion of approximately 1 to 15%. The acidic residuum or the salts thereof and the air-entraining agent may be in dry, wet or dissolved form.

The acidic residuum or the salts thereof can best be defined by reference to the process of arriving at them and by their performance in cementitious mixtures because the ordinary commercial chemical analysis does not adequately characterize the active ingredients or distinguish these materials over those present in the products produced by other methods. The improved character of the products of the present invention is primarily noted in the character of the cement composition in which it is present.

The improvement in properties in concrete containing products of the present invention over the properties obtained through the use of equal amounts of other agents heretofore proposed for use in concrete or cement mortar can be seen from the following examples in which the parts are by weight. The percentage of the plasticizing agents used in the examples to follow was based upon the amount of solids which would remain if the material was vacuum-dried at 60° C. until no further loss in weight occurred. Where the expression "residuum solids of fermented sulfite liquor" is employed, I mean the fermentation product defined in my aforementioned Patent No. 2,435,594.

EXAMPLE 1

Four separate concrete mixtures were prepared, each mixture comprising 8.68 parts of Portland cement, 29.0 parts sand and 32.7 parts ¾ inch trap rock. Mix No. 1 served as the control; it did not contain any additive. To Mix No. 2 was added 0.1% by weight of the cement of acidic residuum. To Mix No. 3 was added 0.1% by weight of the cement of the dried residue from raw waste sulfite liquor. To Mix No. 4 was added 0.1% by weight of the cement of "residuum solids of fermented sulfite liquor." Each of the mixes was prepared with sufficient water to provide approximately the same plasticity as measured by the slump using a 12 inch cone. The slumps for all four mixes were approximately 4 inches. The concrete of each mix was cast into nine 3 x 6 inch cylinders. The compressive strength of three cylinders from each batch was measured after 3 days, and the compressive strength of 3 additional cylinders from each batch was measured at 7 days. In like manner 3 additional cylinders from each batch were tested at 28 days. The pertinent data, including the water ratio by weight, cement factor of the concrete in sacks of cement per cu. yd. of concrete, air content by volume, as measured by the pressure method, are shown in Table 1.

*Table 1*

| Mix No. | Cement Factor s.c.y. | W/C[1] by Wgt. | Air Percent by Vol. | Compressive Strength of 3 x 6 Inch Cylinders at Following Ages— | | |
|---|---|---|---|---|---|---|
| | | | | 3 Days | 7 Days | 28 Days |
| 1 | 5.05 | 0.74 | 1.3 | 1,040(100) | 1,570(100) | 2,900(100) |
| 2 | 5.01 | 0.70 | 1.7 | 1,260(121) | 1,800(115) | 3,460(119) |
| 3 | 5.03 | 0.70 | 1.6 | 975( 94) | 1,670(106) | 2,740( 94) |
| 4 | 5.01 | 0.70 | 1.8 | 930( 89) | 1,780(113) | 3,240(112) |

[1] Consistency held constant.

EXAMPLE 2

Four separate mixes were prepared, each mixture containing the same proportions of cement, sand and stone as in Example 1. Mix No. 1 served as the control; it did not contain any additive. Mixes Nos. 2, 3 and 4 contained the same ingredients as in Mixes Nos. 2, 3 and 4 of Example 1 except that 0.05% by weight of the cement of the acidic residuum, dried raw waste sulfite liquor, and the "residuum solids of fermented sulfite liquor" were used. Each of the mixes was prepared with sufficient water to provide approximately the same plasticity, namely about a 4 inch slump using a 12 inch cone. The concrete of each mix was cast into nine 3 x 6 inch cylinders and compressive strength results were obtained at the ages of 3, 7 and 28 days from three specimens for each age and for each condition of test. The pertinent data similar to that in Table No. 1 are shown in Table 2:

*Table 2*

| Mix No. | Cement Factor s.c.y. | W/C[1] by Wgt. | Air Percent by Vol. | Compressive Strength of 3 x 6 Inch Cylinders at Following Ages— | | |
|---|---|---|---|---|---|---|
| | | | | 3 Days | 7 Days | 28 Days |
| 1 | 5.05 | 0.74 | 1.3 | 1,040(100) | 1,570(100) | 2,900(100) |
| 2 | 5.00 | 0.70 | 2.1 | 1,300(125) | 1,880(123) | 3,900(134) |
| 3 | 5.03 | 0.70 | 1.5 | 1,120(108) | 1,675(107) | 3,200(111) |
| 4 | 5.04 | 0.70 | 1.8 | 1,020( 98) | 1,630(104) | 2,740( 95) |

[1] Consistency held constant.

EXAMPLE 3

Nine separate mixtures were prepared, each mixture comprising 8.68 parts of Portland cement, 29.0 parts sand and 32.7 parts ¾ inch trap rock. Mix No. 1 served as the control; it did not contain any additive. To Mix No. 2 was added 0.1% by weight of the cement of the lime salts of the acidic residuum. To Mix No. 3 was added 0.1% by weight of the cement of hydroxylamine salts of the acid residuum. The hydroxylamine used in this instance was commercial grade triethanolamine. The lime salts were prepared by adding sufficient calcium hydroxide to the liquid form acidic residuum to give a water solution of the reaction products of pH about 7.2. The hydroxylamine salts were prepared in a similar manner, where the amine was triethanolamine and the resulting pH of the water solution of the reaction products was about 7.2. To Mix No. 4 was added 0.1% by weight of the cement of the dried residue of raw waste sulfite liquor. To Mix No. 5 was added 0.1% by weight of the cement of "residuum solids of fermented sulfite liquor." To Mix No. 6 was added 0.05% by weight of the cement, of the lime salts of the acidic residuum. To Mix No. 7 was added 0.05% by weight of the cement of the same hydroxylamine salts of the acidic residuum. To Mix No. 8 was added 0.05% of the dried residue of raw waste sulfite liquor. To Mix No. 9 was added 0.05% by weight of the cement of "residuum solids of fermented sulfite liquor." Each of the mixes, as before, was prepared with sufficient water to provide approximately the same plasticity, namely, about a 4 inch slump as measured by the 12 inch cone. The concrete of each mix was cast into nine 3 x 6 inch cylinders and the compressive strengths were obtained at the ages of 3, 7 and 28 days using 3 cylinders from each mix for each age of test. Pertinent data as given before are contained in Table 3.

*Table 3*

| Mix No. | Cement Factor s.c.y. | W/C[1] by Wgt. | Air Percent by Vol. | Compressive Strength of 3 x 6 Inch Cylinders at Following Ages— | | |
|---|---|---|---|---|---|---|
| | | | | 3 Days | 7 Days | 28 Days |
| 1 | 5.05 | 0.74 | 1.3 | 1,040(100) | 1,570(100) | 2,900(100) |
| 2 | 5.02 | 0.71 | 1.8 | 1,120(108) | 1,650(105) | 3,300(114) |
| 3 | 5.03 | 0.70 | 1.9 | 1,380(133) | 2,125(135) | 3,260(112) |
| 4 | 5.03 | 0.70 | 1.6 | 975( 94) | 1,670(106) | 2,740( 94) |
| 5 | 5.01 | 0.70 | 1.8 | 930( 89) | 1,780(113) | 3,240(112) |
| 6 | 5.04 | 0.70 | 2.1 | 1,240(119) | 1,980(126) | 3,650(126) |
| 7 | 5.00 | 0.70 | 2.3 | 1,340(129) | 2,040(130) | 3,400(117) |
| 8 | 5.03 | 0.70 | 1.5 | 1,120(108) | 1,675(107) | 3,210(112) |
| 9 | 5.00 | 0.70 | 2.4 | 1,020( 98) | 1,630(104) | 2,740( 95) |

[1] Consistency held constant.

EXAMPLE 4

Many times certain indurating compositions, plasticizing agents, or additives perform quite satisfactorily with a given cement but when used with other cements they may not perform in a similar manner. In the three examples given above one single type of Portland cement was used from one source. In this example an entirely different Portland cement was used from a different source. Five separate mixes were prepared and each mixture contained the same amount of cement, sand and stone as given previously in Examples 1, 2 and 3. Each of the mixes was prepared in the same way and nine cylinders were made from each mix so that 3 cylinders could be tested at each of the ages of 3, 7 and 28 days for each condition of test. Mix No. 1 served again as the control; it did not contain any additive. To Mix No. 2 was added 0.1% by weight of the cement of the lime salts of the acidic residuum. To Mix No. 3 was added 0.1% by weight of the cement of the hydroxylamine salts of the acidic residuum. To Mix No. 4 was added 0.1% by weight of the cement of the dried residue of raw waste sulfite liquor. To Mix No. 5 was added 0.1% by weight of the cement of the "residuum solids of fermented sulfite liquor." The cement factor, water-cement ratio and air contents are given as before in Table 4:

*Table 4*

| Mix No. | Cement Factor s.c.y. | W/C[1] by Wgt. | Air Percent by Vol. | Compressive Strength of 3 x 6 Inch Cylinders at Following Ages— | | |
|---|---|---|---|---|---|---|
| | | | | 3 Days | 7 Days | 28 Days |
| 1 | 5.05 | 0.74 | 1.2 | 1,210(100) | 1,950(100) | 3,140(100) |
| 2 | 5.03 | 0.71 | 1.8 | 1,490(123) | 2,460(126) | 3,560(113) |
| 3 | 5.01 | 0.70 | 1.9 | 1,650(136) | 2,420(124) | 3,720(119) |
| 4 | 5.02 | 0.71 | 1.7 | 1,270(105) | 2,000(103) | 3,460(110) |
| 5 | 5.01 | 0.71 | 1.6 | 1,150( 95) | 1,970(101) | 3,080( 98) |

[1] Consistency held constant.

EXAMPLE 5

Eight separate mixtures were prepared, and Mixtures 1, 2, 5 and 6 comprised the same proportions of cement and aggregate as given in Examples 1–4 inclusive. Mixtures 3, 4, 7 and 8 comprised 8.75 parts of Portland cement, of the same type and source as that used in Example 4, 26.6 parts of sand and 35.4 parts of ¾ inch trap rock. The amount of cement and the sand-total aggregate ratio were altered in Mixes 3, 4, 7 and 8 containing an air-entraining agent so that the cement factor would be held constant and so that the S/A ratio (sand-total aggregate ratio) would be comparable to those values in Mixes 1, 2, 5 and 6 which did not contain an air-entraining agent. Mix No. 1 served as the control; it did not contain any additive. To Mix No. 2 was added 3.2% by weight of the cement, of diatomaceous earth having a Klein hydrometer surface area of 15,000 cm.²/gram. To Mix No. 3 was added 1.8 ml. of a liquid A.E.A. (air-entraining agent), composed of water soluble complex hydrocarbon sulfonates, which amount was sufficient to give 4 to 5% air by volume in the resulting concrete mix. To Mix No. 4 was added 1.8 ml. of the same liquid A.E.A. and 3.2% by weight of the cement of the same diatomaceous earth. To Mix No. 5 was added 0.1% by weight of the cement of acidic residuum. To Mix No. 6 was added 0.1% by weight of the cement of acidic residuum and 3.2% by weight of the cement of the same diatomaceous earth. To Mix No. 7 was added the same amount of acidic residuum as in Mix No. 5 and the same amount of A.E.A. as in Mix No. 3. To Mix No. 8 was added the same amount of acidic residuum and A.E.A. as in Mix No. 7 plus 3.2% by weight of the cement of diatomaceous earth. Each of the mixes was prepared with sufficient water to provide approximately the same slump, namely about 4 inches as measured by the 12 inch cone. The number of compressive strength specimens and the ages of tests were the same as before as given in Examples 1–4 inclusive. The essential data for these tests are shown in Table 5.

*Table 5*

| Mix No. | Cement Factor s.c.y. | W/C[1] by Wgt. | Air Percent by Vol. | Compressive Strength of 3 x 6 Inch Cylinders at Following Ages— | | |
|---|---|---|---|---|---|---|
| | | | | 3 Days | 7 Days | 28 Days |
| 1 | 5.05 | 0.74 | 1.2 | 1,210(100) | 1,950(100) | 3,140(100) |
| 2 | 5.03 | 0.75 | 1.2 | 1,260(104) | 2,090(107) | 3,440(109) |
| 3 | 5.01 | 0.68 | 4.5 | 1,330(110) | 2,120(109) | 3,370(107) |
| 4 | 4.99 | 0.69 | 4.4 | 1,340(111) | 2,110(108) | 3,300(105) |
| 5 | 5.00 | 0.70 | 2.3 | 1,550(128) | 2,220(114) | 3,360(107) |
| 6 | 4.99 | 0.71 | 2.0 | 1,760(145) | 2,530(130) | 4,300(137) |
| 7 | 5.01 | 0.63 | 4.9 | 2,000(165) | 2,380(122) | 3,720(119) |
| 8 | 5.01 | 0.63 | 4.2 | 2,540(210) | 3,360(172) | 4,500(143) |

[1] Consistency held constant.

EXAMPLE 6

Eight separate mixtures using the same identical cement as used in Example 5 were prepared in the same way as given in Example 5, except that in place of the acidic residuum used in Mixes 5, 6, 7 and 8 in Example 5, the hydroxylamine salts of acidic residuum were used in Mixes 5, 6, 7 and 8 of this example. The amount of the hydroxylamine salts of acidic residuum was 0.1% by weight of the cement, and the hydroxylamine used to prepare the salts of acidic residuum was commercial grade triethanolamine. The salt was prepared as before in the proportion of 45 parts of acidic residuum to 18 parts of triethanolamine to give a pH of the resulting mixture in solution of water of about 7.2. Mixes 1 to 4 inclusive are identical to Mixes 1 to 4 in Example 5.

*Table 6*

| Mix No. | Cement Factor s.c.y. | W/C[1] by Wgt. | Air Percent by Vol. | Compressive Strength of 3 x 6 Inch Cylinders at Following Ages— | | |
|---|---|---|---|---|---|---|
| | | | | 3 Days | 7 Days | 28 Days |
| 1 | 5.05 | 0.74 | 1.2 | 1,210(100) | 1,950(100) | 3,140(100) |
| 2 | 5.03 | 0.75 | 1.2 | 1,260(104) | 2,090(107) | 3,440(109) |
| 3 | 5.01 | 0.68 | 4.5 | 1,330(110) | 2,120(109) | 3,370(107) |
| 4 | 4.99 | 0.69 | 4.4 | 1,340(111) | 2,110(108) | 3,300(105) |
| 5 | 5.01 | 0.70 | 1.9 | 1,650(136) | 2,420(124) | 3,720(119) |
| 6 | 4.99 | 0.71 | 1.8 | 1,870(155) | 2,650(136) | 4,450(142) |
| 7 | 5.03 | 0.62 | 4.4 | 1,720(137) | 2,650(135) | 4,650(148) |
| 8 | 5.02 | 0.63 | 4.3 | 2,070(171) | 2,780(143) | 4,380(140) |

[1] Consistency held constant.

EXAMPLE 7

Seven separate mixes were prepared from the same cement as in Examples 1, 2 and 3, and the mix proportions are the same as those given in Examples 1 to 3 inclusive. Sufficient water was used to give consistencies for all mixes of about 4 inches of slump as measured by the 12 inch cone. One day compressive strength tests were made in addition to those made at 3, 7, and 28 days using three cylinders at each age for each condition of test. Mix No. 1, as before, served as the control. To Mix No. 2 was added 0.1% by weight of the cement of the hydroxylamine salts of the acidic residuum where the hydroxylamine used was commercial grade triethanolamine. These organic salts were prepared in the same manner as described in Example 6. To Mix No. 3 was added 0.2% by weight of the cement of the same hydroxylamine salts of acidic residuum. To Mixes No. 4 and No. 5 were added 0.2% and 0.3% by weight of the cement of the dried residue of raw waste sulfite liquor, respectively. To Mixes No. 6 and No. 7 were added 0.2% and 0.3% by weight of the cement of the "residuum solids of fermented sulfite liquor," respectively. The data for these mixes are contained in Table 7.

Table 7

| Mix No. | Cement Factor, s.c.y. | W/C¹ by Wgt. | Air, percent by Vol. | Compressive Strength of 3 x 6 Inch Cylinders at Following Ages— | | | |
|---|---|---|---|---|---|---|---|
| | | | | 1 Day | 3 Days | 7 Days | 28 Days |
| 1 | 5.05 | 0.74 | 1.2 | 265(100) | 1,040(100) | 1,570(100) | 2,900(100) |
| 2 | 5.03 | 0.70 | 1.9 | No Data | 1,380(133) | 2,125(135) | 3,260(112) |
| 3 | 5.01 | 0.71 | 2.6 | 208( 79) | 1,330(128) | 2,700(172) | 4,670(161) |
| 4 | 4.93 | 0.70 | 3.7 | 58( 22) | 640( 62) | 1,540( 98) | 2,630( 91) |
| 5 | 4.89 | 0.67 | 5.0 | 26( 10) | 34( 3) | 221( 14) | 1,490( 51) |
| 6 | 5.02 | 0.70 | 3.4 | 95( 36) | 770( 74) | 1,380( 88) | 2,740( 94) |
| 7 | 4.89 | 0.68 | 5.0 | 48( 18) | 610( 59) | 1,390( 88) | 2,360( 81) |

¹ Consistency held constant.

EXAMPLE 8

Seven separate mixes were prepared from the same cement as that used in Examples 4, 5 and 6. Mixes 1 to 4 inclusive had the same mix proportions as Mixes 1 to 4 inclusive given in Examples 1 and 2. Mixes 5 to 7 inclusive had the same mix proportions as Mixes 3, 4, 7 and 8 as given in Example 5. Compressive strengths at 3, 7 and 28 days were obtained on 3 x 6 inch cylinders cured under standard conditions, using three cylinders for each age and each condition of test. Mix No. 1, as before, served as the control. To Mixes 2, 3 and 4 were added 0.1%, 0.2% and 0.3% by weight of the cement of the hydroxylamine salts of the acidic residuum, respectively. Here again the hydroxylamine used was commercial grade triethanolamine. To Mixes 5, 6 and 7 were added 0.1%, 0.2% and 0.3% by weight of the cement of the same hydroxylamine salts of the acidic residuum and 1.8 ml., 3.6 ml. and 5.4 ml. of the same liquid A.E.A. used in Example 5, respectively. The water-cement ratio, cement factor, air content and slump, along with the compressive strength results are contained in Table 8:

Table 8

| Mix No. | Cement Factor, s.c.y. | W/C by Wgt. | Air, percent by Vol. | Slump in Inches | Compressive Strength of 3 x 6 Inch Cylinders at Following Ages— | | |
|---|---|---|---|---|---|---|---|
| | | | | | 3 Days | 7 Days | 28 Days |
| 1 | 5.05 | 0.74 | 1.2 | 4¼ | 1,210(100) | 1,950(100) | 3,140(100) |
| 2 | 5.01 | 0.70 | 1.9 | 4 | 1,650(136) | 2,420(124) | 3,720(119) |
| 3 | 5.00 | 0.70 | 2.7 | 4 | 1,350(112) | 2,320(119) | 3,580(114) |
| 4 | 4.91 | 0.68 | 3.6 | 4 | 1,340(111) | 2,440(125) | 4,340(138) |
| 5 | 4.96 | 0.64 | 4.7 | 3½ | 1,720(142) | 2,650(136) | 4,650(148) |
| 6 | 4.87 | 0.64 | 6.4 | 4¼ | 1,590(131) | 2,310(118) | 3,820(122) |
| 7 | 4.81 | 0.64 | 8.0 | 5 | 1,310(108) | 2,120(109) | 3,240(103) |

EXAMPLE 9

Seven separate mixes were prepared from the same identical cement as that used in Examples 4, 5 and 6. Mix No. 1 had the same mix proportions as all other plain control mixes. Mixes 2 to 7 inclusive had the same mix proportions as Mixes 3, 4, 7 and 8 as given in Example 5. Compressive strengths at 1 and 3 days were obtained on three 3 x 6 inch cylinders at each age for each mix after the specimens were cured under standard conditions. To Mixes 2, 3 and 4 were added the same proportions of the hydroxylamine salts of acidic residuum and liquid A.E.A. as those given in Example 8 for Mixes 5, 6 and 7, respectively. To Mixes 5, 6 and 7 of this example were added the same proportions of the additive as those given in Example 8 for Mixes 5, 6 and 7, respectively; in addition to Mixes 5, 6 and 7 of this example were added 3.2%, 6.4% and 9.6% of the same previously described diatomaceous earth, respectively. The water-cement ratio, cement factor, air content and slump, along with the strength results are contained in Table 9:

Table 9

| Mix No. | Cement Factor, s.c.y. | W/C by Wgt. | Air, Percent by Vol. | Slump in Inches | Compressive Strength of 3 x 6 Inch Cylinders at Following Ages— | |
|---|---|---|---|---|---|---|
| | | | | | 1 Day | 3 Days |
| 1 | 5.05 | 0.74 | 1.2 | 4¼ | 256(100) | 1,210(100) |
| 2 | 4.96 | 0.64 | 4.7 | 3½ | 312(122) | 1,720(142) |
| 3 | 4.87 | 0.64 | 6.4 | 4¼ | 279(109) | 1,590(131) |
| 4 | 4.81 | 0.64 | 8.0 | 5 | 131(51) | 1,310(108) |
| 5 | 4.91 | 0.66 | 4.1 | 3¾ | 542(212) | 1,670(138) |
| 6 | 4.80 | 0.65 | 6.7 | 4 | 553(216) | 1,790(148) |
| 7 | 4.74 | 0.65 | 7.8 | 4¾ | 510(199) | 1,640(136) |

EXAMPLE 10

Four separate mixes were prepared, and Mixture No. 1 contained 8.62 parts of Portland cement, 29.0 parts of sand and 32.7 parts ¾ inch trap rock. Mixes 2, 3 and 4 contained 8.75 parts Portland cement, 26.6 parts sand and 35.4 parts ¾ inch trap rock. Mix No. 1 served as the control; it did not contain any plasticizing agent. The Portland cement used in these tests was the same as that used in the tests set forth in Examples 1, 2 and 3. To Mix No. 2 was added 1.8 ml. of a liquid air-entraining agent, composed of water soluble complex hydrocarbon sulfonates, which amount was sufficient to give 4 to 5% air by volume in the resulting concrete mix. To Mix No. 3 was added 1.6 ml. of the same liquid A.E.A. (air-entraining agent) as used in Mix No. 2 and 0.1% by weight of the cement of the hydroxylamine salts of the acidic residuum where the hydroxylamine was commercial grade triethanolamine. To Mix No. 4 was added the same amounts of both the plasticizing agent and the A.E.A. as used in Mix No. 3, and 3.2% by weight of the cement, of diatomaceous earth, the same as that used in Mix No. 2 in Example 5. Each of the mixes was prepared with sufficient water to provide approximately the same slump, namely about 3 to 4 inches as measured by the 12 inch cone. The freezing and thawing specimens were beams, 3 x 3 x 12 inch. Three beams were made from each of the mixes, and these were moist cured under standard conditions for a period of three months. At the end of the curing period the dynamic modulus of elasticity was determined on each specimen. The specimens were then placed in trays and completely covered with a 5% CaCl₂ solution, after which the trays were placed in a freezer where the temperature was lowered to 0° F. in a period of 40 hours. Then the trays were removed from the freezer and allowed to thaw in the chloride solution for a period of 8 hours at a temperature of 70° F. Then the trays containing the thawed specimens were again placed in the freezer and the freezing and thawing cycle repeated. The change in the dynamic modulus of elasticity of the concrete specimens was measured at the completion of each 5 cycles. The relative durability of the concrete specimens, based on the number of cycles of freezing and thawing to reduce the dynamic modulus of elasticity by 25% was determined, and these values along with the other essential data on the concrete mixes are shown in Table 10.

*Table 10*

| Mix No. | Cement Factor, s.c.y. | W/C¹ by Wgt. | Air, Percent by Vol. | Relative Durability Based on Number of Cycles of Freezing and Thawing to Reduce Dynamic Modulus 25% |
| --- | --- | --- | --- | --- |
| 1 | 5.01 | 0.74 | 1.7 | 100 |
| 2 | 5.01 | 0.68 | 4.7 | 210 |
| 3 | 5.03 | 0.63 | 4.9 | 310 |
| 4 | 5.01 | 0.64 | 4.8 | 375 |

¹ Consistency held constant at slumps of 3–4 inches.

EXAMPLE 11

Six separate mixtures, using a Portland cement different from those used in Examples 1 to 10 inclusive, were prepared. Mixtures 1 and 5 contained 8.68 parts of Portland cement, 26.6 parts of sand and 35.4 parts crushed ¾ inch trap rock. Mixtures 2, 4 and 6 contained 8.75 parts of Portland cement, 24.9 parts sand and 37.4 parts ¾ inch trap rock. Mixture 3 contained 8.56 parts of Portland cement, 26.6 parts sand and 35.4 parts ¾ inch trap rock. The sand total-aggregate ratios were altered in those mixes containing an air-entraining agent so that the $S/A$ in these mixtures would be comparable to those in the mixtures not containing an air-entraining agent. Mix No. 1 served as the control; it did not contain any plasticizing agent or indurating composition. To Mix No. 2 was added 1.8 ml. of the same liquid A.E.A. as used in Mix No. 2 of Example 10. To Mix No. 3 was added 0.1% by weight of the cement of the hydroxylamine salts of the acidic residuum where the hydroxylamine was commercial grade triethanolamine. To Mix No. 4 was added 0.1% by weight of the cement of the same hydroxylamine salts of acidic residuum and 1.8 ml. of the same liquid A.E.A. as used in Mix No. 2. To Mix No. 5 was added 3.2% by weight of the cement, of the same diatomaceous earth as used in Mix No. 4 of Example 10. To Mix No. 6 was added 0.1% by weight of the cement of the same hydroxylamine salts of the acidic residuum and 1.8 ml. of the same liquid A.E.A., and 3.2% by weight of the cement, of the same diatomaceous earth. These mixtures were made to determine the bleeding characteristics (water which accumulates on the concrete surface) of the concretes made up as detailed above. Each of the mixes was prepared with sufficient water to provide approximately the same slump, namely 3½ inches as measured by the 12 inch cone. Each of the concrete mixes, after a 5-minute mixing period, was placed in a 7 inch diameter cylindrical container which was 7 inches in depth. The cylindrical container containing the concrete mix was vibrated for 5 minutes at a frequency of 3600 r.p.m. and then allowed to stand without vibration for a period of two hours. The relative bleeding of the concretes handled in this manner are given in Table 11 where the percentage of bleeding (amount of water removed from concrete surface and measured) is based upon the total bled water relative to the net mixing water used in preparing the plastic concrete. The other essential data on these six mixes are given also in Table 11.

*Table 11*

| Mix No. | Cement Factor, s.c.y. | W/C¹ by Wgt. | Air, percent by Vol. | Relative Bleeding of Concretes, Vibrated 5 Min. and then static for 2 Hrs. Based on Total Bled Water of Net Mixing Water |
| --- | --- | --- | --- | --- |
| 1 | 5.07 | 0.732 | 1.2 | 100 |
| 2 | 4.98 | 0.684 | 4.1 | 73 |
| 3 | 5.00 | 0.695 | 2.0 | 79 |
| 4 | 5.00 | 0.645 | 4.5 | 62 |
| 5 | 5.03 | 0.752 | 1.0 | 70 |
| 6 | 5.01 | 0.655 | 4.1 | 47 |

¹ Consistency held constant at about 3½ inch slump.

It will be seen from the above examples that cement compositions containing acidic residuum and the salts thereof are superior in strength, both at early and late ages, to cement compositions which do not contain any addition. It will be seen further from the above examples that the acidic residuum and the salts thereof provided far greater improvement in the compressive strengths at early and late ages in concrete than that which was obtained by the use of the dried residue from raw waste sulfite liquor or the "residuum solids of fermented sulfite liquor." While all of these sulfite liquor derivatives are derived from wood pulp manufacture, their performance in concrete is outstandingly different as shown by the above examples.

Referring to Examples 1 and 2, it will be noted that the cement compositions containing the dried residue from raw waste sulfite liquor and those containing the "residuum solids from fermented sulfite liquor" at 3, 7 and 28 days had materially less strength than the concrete which contained the acidic residuum. When 0.1% by weight of the cement of the dried residue of raw waste sulfite liquor or the "residuum solids of fermented sulfite liquor" were used in concrete, the compressive strengths at 3 days were substantially below the corresponding compressive strength of the concrete which did not contain any addition. This retardation at early ages for the dried residue of raw waste sulfite liquor or the "residuum solids of fermented sulfite liquor," is a serious detriment. It will also be observed in Examples 1 and 2 that the water-reducing qualities of the acidic residuum when used in concrete is at least equivalent to the water-reducing qualities of the dried residue from raw waste sulfite liquor and "residuum solids of fermented sulfite liquor."

From the table in Example 3 it is apparent that the inorganic and organic salts of acidic residuum when used in cement compositions give compressive strengths at early and late ages which are far superior to the compressive strengths of corresponding concrete made with the dried residue of raw waste sulfite liquor or the "residuum solids of fermented sulfite liquor." Here again, it will be noted that the 3 day compressive strengths for the concretes containing 0.1% by weight of the cement of the dried residue from raw waste sulfite liquor or the "residuum solids of fermented sulfite liquor" are substantially below the corresponding compressive strengths of concrete containing no addition.

The data in Table 4 of Example 4, are similar to that contained in Table 3 except that a different cement from a different manufacturer was used. Here again, it will be noted that the inorganic and organic salts of acidic residuum when used in concrete gave outstanding compressive strengths at early and late ages as compared to corresponding concrete containing no addition or the concrete containing the dried residue of raw waste sulfite liquor or the "residuum solids of fermented sulfite liquor."

Referring to Table 5 of Example 5, it will be noted that the performance of the acidic residuum when used in combination with diatomaceous earth is outstanding with respect to compressive strengths at early and late ages as compared to corresponding concrete containing no addition or concrete containing only diatomaceous earth or concrete containing only the acidic residuum. This outstanding performance as shown by Mix No. 6 can not be accounted for on the basis of the compressive strength performance of Mix No. 2 and Mix No. 5 in Table 5. In a corresponding manner, it will be noted for Mix No. 7 that when the acidic residuum is used in conjunction with an air-entraining agent, I again obtained remarkable compressive strength results at early and late ages as compared to the corresponding compressive strengths for concrete containing no addition or concrete containing only an air-entraining agent or concrete containing only the acidic residuum. Here again, the remarkable performance of this combination of substances can not be accounted for on the basis of the compressive strength performance obtained in Mixes 3 and 5 of Table 5. The compressive strength results obtained in Mix No. 8, where the acidic residuum was used in conjunction with an air-entraining agent and with diatomaceous earth, were exceptionally outstanding. This extraordinary unexpected performance of this combination of substances can not be accounted for on the basis of the compressive strength performance obtained in Mixes 2 to 7 inclusive.

The data in Table 6 of Example 6 are similar to those in Table 5, except that the hydroxylamine salts of acidic residuum were used instead of the acidic residuum. The same comparisons made previously in Example 5 can be made here in Example 6. These data are convincing evidence that the acidic residuum or the salts thereof give outstanding unexpected compressive strength performance in concrete when these plasticizing agents are used in conjunction with air-entraining agents and diatomaceous earth. I have no basic explanation for this outstanding performance except that the discovery appears to be one showing a synergistic effect.

The data in Table 7 of Example 7 illustrate the influence of different amounts of hydroxylamine salts of acidic residuum and different amounts of the dried residue from raw waste sulfite liquor and different amounts of "residuum solids from fermented sulfite liquor," on the compressive strength of concrete at early and late ages. The hydroxylamine salts of acidic residuum when used in the amounts of 0.1% and 0.2% by weight of the cement, the compressive strengths of the concrete at 1, 3 and 7 and 28 days are exceptional as compared to the compressive strengths at corresponding ages of plain concrete containing no addition. However, in the case of the dried residue of raw waste sulfite liquor and "residuum solids of fermented sulfite liquor," serious retardation of the normal Portland cement hydration reactions has occurred so that the compressive strengths for these plasticizing agents at the ages of 1, 3, 7 and 28 days have been seriously impaired. This is particularly true, for Mixes 4, 5, 6 and 7 at the age of 1 day. These data illustrate the serious trouble that can be obtained in concrete when either of these latter plasticizing agents are used inadvertently in amounts in excess of those recommended by the manufacturers. Even when the recommended dosages are 0.2% by weight of the cement, low strength values are obtained at the early ages as compared to the corresponding strengths of plain concrete with no addition.

The mixes in Table 8 of Example 8, were designed to show the influence of normal and excess amounts of the additive composed of the hydroxylamine salts of acidic residuum on the compressive strengths of Portland cement concrete. Also these mixes were designed to show the influence of normal amounts and excess amounts of the hydroxylamine salts of acidic residuum when used in conjunction with an air-entraining agent in normal and excess amounts on the compressive strength of Portland cement concrete. The cement used in the mixes appearing in Table 8 was different from that used in the mixes appearing in Table 7. Mixes 2, 3 and 4 contained 0.1%, 0.2% and 0.3% by weight of the cement of the hydroxylamine salts of acidic residuum where the consistency was held constant at about 4 inches. It will be noted again that high percentages of the additive had a beneficial effect on the compressive strengths of plain concrete at the corresponding ages. In Mixes 5, 6 and 7, the indurating composition used was composed of hydroxylamine salts of the acidic resdiuum in conjunction with a liquid air-entraining agent. This additive was formulated so that Mix No. 5 contained 0.1% by weight of the cement of the plasticizing agent and sufficient liquid air-entraining agent to give approximately 4–5% of entrained air in the resulting concrete. The amount of the additive used in Mix No. 5, was doubled in Mix No. 6 and tripled in Mix 7. The water-cement ratio was held constant and the slumps varied from 3½ inches for Mix 5, to 5 inches for Mix 7. Correspondingly, the air contents varied from 4.7% for Mix 5 to 8% for Mix 7. In comparing Mix 2 with Mix 5, it will be noted the presence of the air-entraining agent has enhanced the performance of the hydroxylamine salts of the acidic residuum as measured by the compressive strengths at the ages of 3, 7 and 28 days. This improvement has been obtained despite the fact that the air content increased from 1.9% by volume in Mix 2 to 4.7% by volume in Mix 5. As mentioned previously, it is recognized in the art and those familiar with the technology of concrete that increasing the air content of Portland cement concrete almost always causes a reduction in the compressive strength. This is not the case with the additive used in Mix 5. It is of interest to note that as the amount of the additive is increased as in Mixes 6 and 7, and as the air content increases in these two mixes, the compressive strengths of the concretes at 3, 7 and 28 days are substantially superior to plain concrete containing no addition. I have found that when using an additive composition similar to that used in Mix No. 5, that excess amounts of this additive which cause excess amounts of entrained air, improve the compressive strengths of concrete. If the slump in Mixes 6 and 7 had been held constant to that for Mix 5, the resulting lower water-cement ratios in Mixes 6 and 7 would have caused even higher compressive strengths than those shown in Table 8 for these two concrete mixes.

Mixes 1, 2, 3 and 4 given in Table 9 of Example 9 are the same mixes represented by the data given for Mixes 1, 5, 6 and 7, in Table 8. Mix 5 in Table 9 contained an additive composition which was the same as the composition used in Mix No. 2 except that 3.2% by weight of the cement of diatomaceous earth was added. Mix 6 was identical to Mix 5 except that the quantity of the additive was doubled. In Mix 7 the quantity of the additive used in Mix 5 was tripled. Here it will be noted in Mixes 5–7 inclusive that the presence of the diatomaceous earth with the hydroxylamine salts of the acidic residuum in conjunction with an air-entraining agent gave outstanding and unexpected compressive strength results at the ages of 1 and 3 days.

The concrete mixes given in Table 10 of Example 10 were designed to show the influence of an air-entraining agent, an indurating composition composed of an air-entraining agent and hydroxylamine salts of the acidic residuum and an indurating composition composed of a liquid air-entraining agent plus the same hydroxylamine salts of the acidic residuum and diatomaceous earth of extreme fineness, on the freezing and thawing durability of concrete. It will be noted in Table 10 that the cement factor was held constant for all four concrete mixtures, and the air contents were essentially constant for all of the treated concrete mixes (Mixes 2, 3 and 4). The liquid air-entraining agent Mix No. 2 had a relative durability of 210. When this same air-entraining agent was used in conjunction with the hydroxylamine salts of the acidic residuum, the relative durability was increased to 310 (see Mix No. 3, Table 10). In Mix No. 4, which was identical in composition to Mix No. 3, except that 3.2% of diatomaceous earth had been added, the relative durability was still further increased to 375.

These data show that even when the cement factor and the air content is held constant, it is possible to use my discovery with conventional air-entraining agents and still further improve the freezing and thawing durability of Portland cement concrete. The improvement in freezing and thawing durability of the concrete made from Mix No. 3 is substantial when compared with that of the concrete made from Mix No. 2. This improvement can only be attributed to the influence of the hydroxylamine salts of the acidic residuum because the air-content and cement factor of Mixes Nos. 2 and 3 are essentially the same. Air-entrainment, when controlled, in concrete has been considered the only medium which would substantially improve the freezing and thawing durability of concrete. However, my discovery shows that still larger improvement in durability can be obtained by the action of the plasticizing agent only. I have no explanation for this mechanism. The improvement of freezing and thawing durability of the concrete made from Mix No. 4 over that of the concrete made from Mix No. 3 is again substantial. Here I believe that the function of the diatomaceous earth is such that due to pozzolanic action (lime-silica reaction) a very low permeability concrete is obtained, which, therefore, is less readily attacked by the disintegrating forces of freezing and thawing.

The data given in Table 10 are typical of many such concrete tests I have made where different cements, aggregates and other physical characteristics were involved. In all such tests I have found that diatomaceous earth of extreme fineness enhances the freezing and thawing durability of concretes containing the residuum solids of bacteria altered sulfite liquor in conjunction with a conventional air-entraining agent.

The concrete mixes in Table 11 of Example 11 were made to show the influence of various additives to Portland cement concrete on the bleeding characteristics of such mixtures. Bleeding is defined as the free water which accumulates on a concrete surface. In concrete mixes that have a high degree of cohesiveness (fatness) the amount of bleeding is held to a minimum. Bleeding, in general, is recognized as a detrimental property of most plain concretes and, therefore, anything that can be done to reduce bleeding is considered to be desirable. It is known also to those experienced in the field of concrete technology, that air-entraining agents, some finely divided pozzolans, cement or any other fine material when added to concrete will reduce bleeding to some extent. In the mixes reported in Table 11 it will be noted that the cement factors and the consistencies were held essentially constant so that these properties did not influence the bleeding characteristics. The plain mix (No. 1) was given a bleeding rating of 100. When an air-entraining agent was used, as in Mix No. 2, the relative bleeding was reduced to 73. This reduction in bleeding for Mix No. 2 can be attributed to the influence of the entrained air. In Mix No. 3 it will be noted that the bleeding was reduced to a value of 79. This mix contained only the hydroxylamine salts of the acidic residuum. The reduction in bleeding for Mix No. 3 cannot be attributed to air-entrainment, but rather to the function of the plasticizing agent. In Mix No. 5 the relative bleeding was reduced to 70, and in this mix only the diatomaceous earth was used. This reduction in bleeding may be considered to be due to the extremely fine active pozzolan present in the mixture. Therefore, Mixes 2, 3 and 5 each show the influence on the bleeding characteristics of an air-entraining agent, the plasticizing agent and diatomaceous earth when used in a given concrete mix. Mix No. 4 was identical to Mix No. 2 (the latter which contains only an air-entraining agent) except that 0.1% by weight of the cement of the hydroxylamine salts of the acidic residuum was added. It will be noted that the bleeding was reduced from a value of 73 for the air-entraining agent only, to a value of 62 when the air-entraining agent was used in conjunction with the plasticizing agent as disclosed in this invention. Mix No. 6 was identical to Mix No. 4 except that in addition to the plasticizing agent and the air-entraining agent, diatomaceous earth was added. Here it will be noted that the bleeding rate for Mix No. 4, which was 62, was reduced to 47 in Mix No. 6. In other words, Mix No. 6 showed 53% less bleeding than the corresponding plain mix containing no additive. These data show very clearly the desirable influence of the plasticizing agent and the plasticizing agent in conjunction with diatomaceous earth in an air-entrained concrete mix. The outstanding reduction in bleeding of Mix No. 6 is far greater than one would expect on the basis of the influence of the individual ingredients contained in the indurating composition used in this mixture.

The Portland cement utilized in the above examples may be substituted by other hydraulic cements such as aluminous cements. The quantities of the ingredients may be varied or the aggregate may be omitted entirely in accordance with the usual practice as recognized by those skilled in the art.

Furthermore, it is to be noted that the particular form of products shown and described and the particular procedure set forth are presented for purposes of explanation and illustration, and that modifications of said products and procedure can be made without departing from my invention as defined in the appended claims.

What I claim is:

1. A cement composition comprising a hydraulic cement and at least 0.01%, by weight of the cement, of an indurating composition consisting essentially of the residuum of sulfite liquor which has been altered with bacteria which convert the sugar therein to acids.

2. A cement composition comprising a hydraulic cement and at least 0.01%, by weight of the cement, of an indurating composition consisting essentially of salts of the acidic components of the residuum of sulfite liquor which has been altered with bacteria which convert the sugar therein to acids.

3. A cement composition comprising a hydraulic cement and approximately 0.05% to 0.3%, by weight of the cement, of an indurating composition consisting essentially of the residuum of sulfite liquor which has been altered with bacteria which convert the sugar therein to acids.

4. A cement composition comprising a hydraulic cement and approximately 0.05% to 0.3%, by weight of the cement, of an indurating composition consisting essentially of salts of the acidic components of the residuum of sulfite liquor which has been altered with bacteria which convert the sugar therein to acids.

5. A composition of claim 1 which also contains an air-entraining agent.

6. A composition of claim 1 which also contains a pozzolanic material.

7. A composition of claim 1 which also contains an air-entraining agent and a pozzolanic material.

8. A composition of claim 2 which also contains an air-entraining agent.

9. A composition of claim 2 which also contains a pozzolanic material.

10. A composition of claim 2 which also contains an air-entraining agent and a pozzolanic material.

11. An indurating composition for hydraulic cement mixes, consisting essentially of the residuum of sulfite liquor which has been altered with bacteria which convert the sugar therein to acids.

12. An indurating composition for hydraulic cement mixes, consisting esesntially of the salts of the acidic components of the residuum of sulfite liquor which has been altered with bacteria which convert the sugars therein to acids.

13. The composition of claim 12 in which the salts of the acidic components of the residuum are the reaction product of the acidic components of the residuum and an inorganic base.

14. The composition of claim 12 in which the salts of the acidic components of the residuum are the reaction product of the acidic components of the residuum and an organic base.

15. The composition of claim 11 which also contains an air-entraining agent.

16. The composition of claim 11 which also contains a pozzolanic material.

17. The composition of claim 11 also contains an air-entraining agent and a pozzolanic material.

18. The composition of claim 12 which also contains an air-entraining agent.

19. The composition of claim 12 which also contains a pozzolanic material.

20. The composition of claim 12 which also contains an air-entraining agent and a pozzolanic material.

21. A concrete or mortar mix comprising a hydraulic cement, approximately 0.01% to 0.5%, by weight of the cement, of an indurating composition consisting essentially of the residuum of sulfite liquor which has been altered with bacteria which convert the sugar therein to acids, an air-entraining agent and a pozzolanic material.

22. A concrete or mortar mix comprising a hydraulic cement, approximately 0.01% to 0.5%, by weight of the cement, of an indurating composition consisting essentially of the salts of the acidic components of the residuum of sulfite liquor which has been altered with bacteria which convert the sugar therein to acids, an air-entraining agent and a pozzolanic material.

References Cited in the file of this patent

UNITED STATES PATENTS

| | | |
|---|---|---|
| 2,005,069 | Bernier | Jan. 18, 1935 |
| 2,320,010 | Ralston | May 25, 1943 |
| 2,435,594 | McPherson | Feb. 10, 1948 |
| 2,690,975 | Scripture | Oct. 5, 1954 |

FOREIGN PATENTS

| | | |
|---|---|---|
| 531,469 | Great Britain | Jan. 6, 1941 |